United States Patent
Ergen et al.

(10) Patent No.: US 11,259,243 B2
(45) Date of Patent: Feb. 22, 2022

(54) METHOD AND SYSTEM FOR SHARING WI-FI IN A WI-FI NETWORK USING A CLOUD PLATFORM

(71) Applicant: Ambeent Wireless, Istanbul (TR)

(72) Inventors: Mustafa Ergen, Istanbul (TR); Onur Ergen, Istanbul (TR); Mehmet Fatih Tuysuz, Istanbul (TR)

(73) Assignee: AMBEENT WIRELESS, Istanbul (TR)

( * ) Notice: Subject to any disclaimer, the term of this patent is extended or adjusted under 35 U.S.C. 154(b) by 0 days.

(21) Appl. No.: 16/900,525

(22) Filed: Jun. 12, 2020

(65) Prior Publication Data
US 2021/0392576 A1 Dec. 16, 2021

(51) Int. Cl.
| | |
|---|---|
| *H04W 48/20* | (2009.01) |
| *H04W 16/14* | (2009.01) |
| *H04W 76/10* | (2018.01) |
| *H04M 15/00* | (2006.01) |

(Continued)

(52) U.S. Cl.
CPC .......... *H04W 48/20* (2013.01); *H04M 15/61* (2013.01); *H04M 15/8016* (2013.01); *H04W 16/14* (2013.01); *H04W 60/00* (2013.01); *H04W 76/10* (2018.02); *H04W 84/12* (2013.01)

(58) Field of Classification Search
CPC ....... H04W 4/02; H04W 84/12; H04W 12/06; H04W 12/63; H04W 4/24; H04W 80/04; H04W 84/18; H04W 12/04; H04W 12/0431; H04W 12/73; H04W 88/06; H04W 112/04; H04W 12/043; H04W 15/61; H04W 15/8016; H04W 16/14; H04W 48/20; H04W 76/10; H04L 12/145; H04L 12/1453
See application file for complete search history.

(56) References Cited

U.S. PATENT DOCUMENTS

| | | | | |
|---|---|---|---|---|
| 2005/0188074 A1* | 8/2005 | Voruganti | ............... | H04L 69/12 709/224 |
| 2011/0075675 A1* | 3/2011 | Koodli | ............... | H04L 12/1485 370/401 |

(Continued)

OTHER PUBLICATIONS

International Search Report and Written Opinion in PCT/US2021/036969 dated Jul. 9, 2021.

*Primary Examiner* — Jean A Gelin
(74) *Attorney, Agent, or Firm* — Chip Law Group

(57) ABSTRACT

The invention provides a method and system for sharing Wi-Fi in a Wi-Fi network using a cloud platform. To start with, the method and system enables registration of one or more Wi-Fi access points on the cloud platform and enables a client device to rent a Wi-Fi connection from owner of a Wi-Fi access point. Subsequently, the method and system enables the client device to select a Wi-Fi access point registered on the cloud platform based on usage fee, properties and signal quality. Further, the method and system performs offload optimization using an AI module by deciding whether data offloading from licensed spectrum to unlicensed spectrum is desirable or not. In response to deciding that data offload is desirable, the client device is allowed to connect to the selected Wi-Fi access point and transact with the Wi-Fi access point owner using cryptocurrencies in a blockchain-based network.

28 Claims, 10 Drawing Sheets

(51) Int. Cl.
*H04W 60/00* (2009.01)
*H04W 84/12* (2009.01)

(56) References Cited

U.S. PATENT DOCUMENTS

| | | | |
|---|---|---|---|
| 2014/0073288 A1* | 3/2014 | Velasco | H04W 12/06 |
| | | | 455/411 |
| 2014/0073289 A1* | 3/2014 | Velasco | H04W 4/02 |
| | | | 455/411 |
| 2014/0293829 A1* | 10/2014 | Visuri | H04M 15/8351 |
| | | | 370/254 |
| 2015/0195760 A1* | 7/2015 | Sanz | H04W 12/068 |
| | | | 370/230 |
| 2016/0278138 A1 | 9/2016 | Chen et al. | |
| 2016/0381606 A1* | 12/2016 | Lou | H04W 36/0066 |
| | | | 370/331 |
| 2018/0176845 A1* | 6/2018 | Visuri | H04W 36/0072 |
| 2018/0285996 A1* | 10/2018 | Ma | G06F 16/2428 |
| 2019/0012752 A1* | 1/2019 | Rockafellow | G06F 16/951 |
| 2020/0059430 A1* | 2/2020 | Trautmann | G06Q 20/065 |
| 2021/0058787 A1 | 2/2021 | Isgar | |

* cited by examiner

METHOD AND SYSTEM FOR SHARING WI-FI IN A WI-FI NETWORK USING A CLOUD PLATFORM

FIELD OF THE INVENTION

The invention generally relates to renting/sharing Wi-Fi in a Wi-Fi network including a plurality of client devices and a plurality of Wi-Fi access points. More specifically, the invention relates to a method and system for enabling a client device to rent/share Wi-Fi, and optimizing data offload in a Wi-Fi network using a cloud platform, and enabling the client device to transact with a Wi-Fi access point owner using cryptocurrencies in a blockchain-based network.

BACKGROUND OF THE INVENTION

Wi-Fi networks are formed using one or more Wi-Fi access points that support a connection of multiple wireless devices to a wired connection for access to the Internet. Due to huge demand, enormous number of Wi-Fi access points are deployed in places such as, but not limited to, residential spaces, apartments, office buildings and public spaces and the Wi-Fi access points are densely concentrated around certain places with high data traffic.

Currently, the increase in usage of wireless devices has increased the demand for usage of mobile data and services. However, the corresponding infrastructure has not kept up with this demand. Wireless devices connect to data sources primarily through cellular networks, and the cellular carriers (i.e., the operators of the cellular networks) have not been able to support the demand for mobile data and services through the cellular network alone.

Further, users of wireless devices such as, but not limited to, smart phones and mobile phones, often run into problems when too many users are attempting to use too few network resources. For example, Internet traffic can become slow and congested if there are too many users requesting channels from a cellular base station. To avoid the limitations and costs associated with cellular telephony, many wireless device users switch to Wi-Fi or other non-cellular connection protocols when possible. This type of switching is typically done by a user having to take active steps to use non-cellular connection protocols (e.g., choosing a Wi-Fi network by name). Although Wi-Fi service is presently cheaper than cellular service, in any particular location a Wi-Fi network may itself become overwhelmed by user demand. Wi-Fi access is typically not free, and the costs associated with such access may make the use of the Wi-Fi network sub-optimal, both with respect to speed and cost.

Moreover, the congestion problem in usage of Wi-Fi resources is solved using a mesh network in which user's devices communicate directly with one another instead of via the cellular network. In such cases, the system traffic can be passed from one user device to another until the data is eventually transmitted to a fast, available connection to the Internet. However, mesh networks suffer from severe problems such as determining a route they should use in the mesh, which can cause enormous inefficiency, both in terms of transmission performance (unstable or low throughput connections) and quickly draining the battery of network devices.

Further, a typical criterion in wireless communication is the high cost of licensed spectrum which force the operators to deploy Wi-Fi access points to crowded places for offloading the cellular data to the Wi-Fi network. On the other hand, the license spectrum of Wi-Fi network covers only a small portion of overall customers within a basic service set (BSS) or an extended service set (ESS), which hinders exploiting the overall potential of unlicensed spectrum for offloading. In addition to operators, client devices for example, mobile devices prefer Wi-Fi access points because of its high link speed, price and energy efficiency. However, the major concern enabling Wi-Fi sharing and offloading both for the operator and customers is that it directly requires secure and efficient transactions while preventing unwanted incidents such as, but not limited to, double spending.

Therefore, in light of the above, there exists a need for a method and system for enabling secure and efficient transactions for Wi-Fi renting/sharing and optimizing data offload decisions in a Wi-Fi network.

BRIEF DESCRIPTION OF THE FIGURES

The accompanying figures with reference numerals refer to identical or functionally similar elements throughout separate views and which together with the detailed description below are incorporated in and form part of the specification, serve to further illustrate various embodiments and to explain various principles and advantages all in accordance with the invention.

Figure 1:
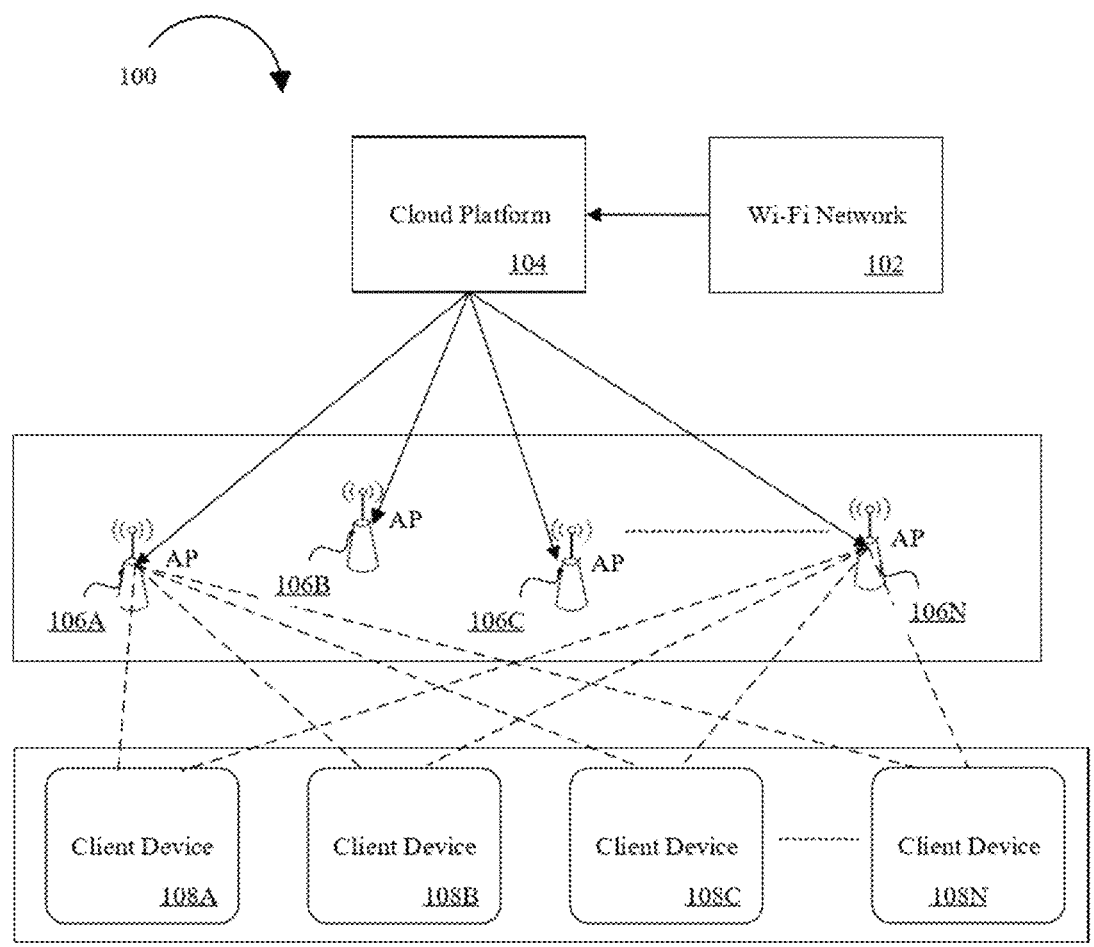
FIG. 1 illustrates a system for renting/sharing Wi-Fi in a Wi-Fi network using a cloud platform in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to enabling a client device to rent/share Wi-Fi and optimizing data offload in a Wi-Fi network using a cloud platform, and enabling the client device to transact with a Wi-Fi access point owner using cryptocurrencies in a blockchain-based network.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for renting/sharing Wi-Fi in a Wi-Fi network using a cloud platform. The Wi-Fi network includes a plurality of Wi-Fi access points and a plurality of client devices. To start with, the method and system enables registration of one or more Wi-Fi access points of the plurality of Wi-Fi access points on the cloud platform. Subsequently, the method and system enables a client device of the plurality of client devices to rent a Wi-Fi connection from owner of a Wi-Fi access point registered on the cloud platform. In order to rent the Wi-Fi connection from owner of the Wi-Fi access point, the method and system enables the client device to select a Wi-Fi access point registered on the cloud platform based on criteria such as, but not limited to, usage fee, properties of the Wi-Fi connection (802.11 protocol) and signal quality. In an ensuing step, the method and system performs data offload optimization using an AI module by deciding whether data offloading from licensed spectrum to unlicensed spectrum is desirable or not based on parameters such as, but not limited to, Wi-Fi interference, number of users, licensed spectrum status, costs, client device characteristics, Received Signal Strength Indicator (RSSI), and energy efficiency. The licensed spectrum is used by a cellular network and the unlicensed spectrum is used by the Wi-Fi network. In response to deciding that data offloading is desirable, the client device is allowed to access/connect to the selected Wi-Fi access point and the client device is enabled to transact with the Wi-Fi access point owner using cryptocurrencies in a blockchain-based network. The cryptocurrencies are transferred from the client device to the Wi-Fi access point owner based on a required time of connection under predetermined constraints and conditions.

FIG. 1 illustrates a system 100 for renting/sharing Wi-Fi in a Wi-Fi network 102 using a cloud platform 104 in accordance with an embodiment of the invention.

As illustrated in FIG. 1, cloud platform 104 is communicatively coupled to a plurality of Wi-Fi access points 106A-106N and a plurality of client devices 108A-108N via Wi-Fi network 102. Wi-Fi network 102 can be, but need not be limited to, a 5G autonomic network. In an embodiment, cloud platform 104 may be implemented as an application in plurality of client devices 106A-106N. The application can be, but need not be limited to, a mobile application.

Plurality of Wi-Fi access points 106A-106N are deployed in places such as, but not limited to, homes, enterprises and public spaces. Plurality of client devices 108A-108N are user devices such as, but not limited to, a mobile device, a personal digital assistant, a computer, a laptop, a smart phone and a tablet.

System 100 enables registration of one or more Wi-Fi access points of plurality of Wi-Fi access points 106A-106N on cloud platform 104. Further, system 100 enables a client device 108A of plurality of client devices 108A-108N to rent a Wi-Fi connection from owner of a Wi-Fi access point 106A of plurality of client devices 106A-106N registered on cloud platform 104. Thus, cloud platform 104 acts as an intermediary between the one or more Wi-Fi access points and client device 108A for renting/sharing Wi-Fi. Various modules of cloud platform 104 are further described in detail in conjunction with FIG. 2.

Figure 2:
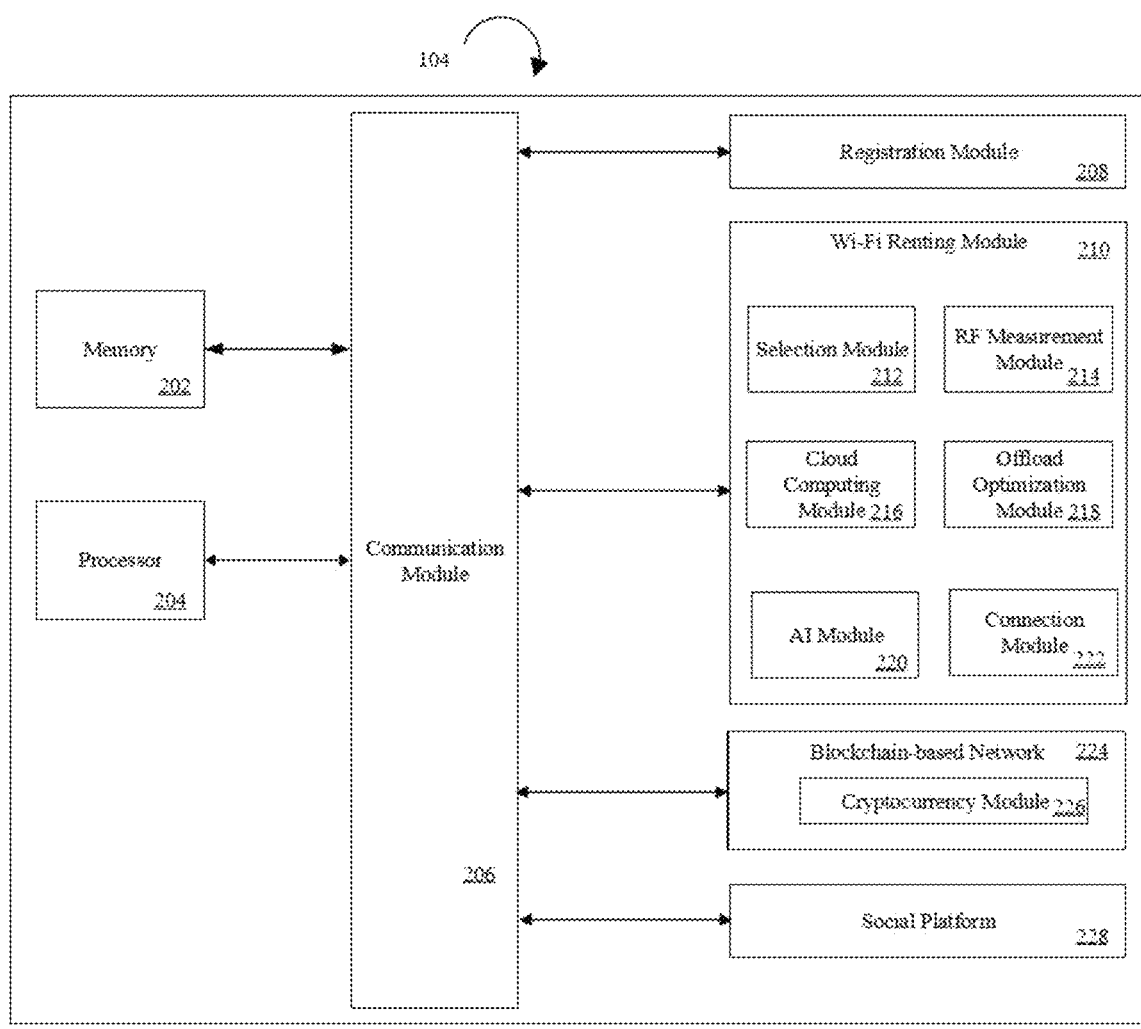
FIG. 2 illustrates various modules of the cloud platform for renting/sharing Wi-Fi in the Wi-Fi network in accordance with an embodiment of the invention.

FIG. 2 illustrates various modules of cloud platform 104 for renting/sharing Wi-Fi in Wi-Fi network 102 in accordance with an embodiment of the invention.

As illustrated in FIG. 2, cloud platform 104 includes a memory 202, and a processor 204 communicatively coupled to memory 202. Memory 202 and processor 204 further communicate with various modules of cloud platform 104 via a communication module 206.

Communication module 206 may be configured to transmit data between modules, engines, databases, memories, and other components of cloud platform 104 for use in performing the functions discussed herein. Communication module 206 may include one or more communication types and utilize various communication methods for communication within cloud platform 104.

Cloud platform 104 includes a registration module 208 which enables registration of one or more Wi-Fi access points of plurality of Wi-Fi access points 106A-106N. The registration of one or more Wi-Fi access points is made through a client device application or website via submission of details such as, but not limited to, a Wi-Fi password, gateway username, gateway password, Wi-Fi access point MAC address, Wi-Fi properties and usage fee. Also, the details corresponding to the submission can be changed based on demand or requirement of the one or more Wi-Fi access points owners.

Cloud platform 104 further includes a Wi-Fi renting module 210 which enables a client device 108A of plurality of client devices 108A-108N to rent a Wi-Fi connection from owner of a Wi-Fi access point 106A of plurality of Wi-Fi access points 106A-106N registered on cloud platform 104.

Wi-Fi renting module 210 includes a selection module 212 for enabling client device 108A to select Wi-Fi access point 106A based on a usage fee, properties of the Wi-Fi connection (802.11 protocol) and signal quality. The usage fee for accessing Wi-Fi access point 106A is determined and set by the Wi-Fi access point owner using one or more pricing models. Selection module 212 is further described in detail in conjunction with FIG. 3.

Further, cloud platform 104 includes an RF measurement module 214 for scanning RF environment around plurality of client devices 108A-108N and receiving measurements from the one or more Wi-Fi access points registered on cloud platform 104. These measurements are further analyzed to determine signal quality of the one or more Wi-Fi access points. Based on the scanning, Wi-Fi renting module 210 collects RF measurements from RF measurement module 214 to report probable Wi-Fi access points for connection or offloading cellular data to Wi-Fi network 102 and the RF measurements are stored on cloud platform 104. The scan procedure covers the whole unlicensed spectrum, which is divided into several channels based on country regulations.

Furthermore, RF measurement module 214 may be installed on different hardware. In an embodiment, RF measurement module 214 is installed in client devices with different operating systems. For instance, Android devices provide the scanning functionality from externally installed applications whereas iOS is limited to rooted devices only. In another embodiment, RF measurement module 214 is installed in Wi-Fi access points. The Wi-Fi access points determines the modulation for a particular data packet based on RSSI from client devices to which it is connected. Usually, the Wi-Fi access points do not deliver or stream data packets to a cloud or any other software unless a specific software is installed on the Wi-Fi access points. Lastly, with addition of both hardware and software, some Wi-Fi access points scan their environment directly, eliminating the need of a client device for RF measurement. RF measurement module 214 is further described in detail in conjunction with FIG. 4, FIG. 5, FIG. 6, and FIG. 7.

Wi-Fi renting module 210 also includes a cloud computing module 216 which is installed where the data of Wi-Fi access points and users are stored, processed and the most optimal result is re-transmitted to the user. Using cloud computing module 216, a list of registered Wi-Fi access points is stored in the cloud, and effective spectrum as a service approach is performed via techniques such as, but not limited to, basic service set (BSS) coloring, dynamic frequency selection (DFS), spectrum brokerage, sub-channel sharing, blockchain operations, and secure password sharing.

Moving on, upon client device 108A selecting Wi-Fi access point 106A for renting, Wi-Fi renting module 210 includes an offload optimization module 218 for performing offload optimization using an AI module 220 by deciding whether data offloading from licensed spectrum to unlicensed spectrum is desirable or not. The licensed spectrum is used by a cellular network and the unlicensed spectrum is used by Wi-Fi network 102. Offloading transfers the data flow from licensed spectrum to unlicensed spectrum. The shift from the licensed to unlicensed spectrum is not always a wise decision since the interference in the unlicensed spectrum might cause significant QoS reduction, causing customer dissatisfaction and data delivery failures. On the other hand, there should be enough demand in the licensed spectrum to offload or the unlicensed spectrum should be significantly idle to make offloading practically desirable. Thus, offload optimization module 218 enables mobile operators to reduce costs and increase QoS for a user of a client device by tracking download patterns of plurality of client devices 108A-108N and enabling a high downloading client device of plurality of client devices 108A-108N to offload data to reduce the burden on the licensed spectrum. AI module 220 decides that data offloading is desirable when there is enough demand in the licensed spectrum or if the unlicensed spectrum is significantly idle.

The offloading mechanism of offload optimization module 218 is different from that of personal users in which case the Wi-Fi access point owners have the option to accept or reject the connection request based on any personal reason. For the case of the operator, the user does not have to request Wi-Fi access from the operator Wi-Fi access points. The client device application detects any operator Wi-Fi access point and starts the association if AI module 220 decides the offload is desirable based on parameters such as, but not limited to, Wi-Fi interference, number of users, licensed spectrum status, costs, client device characteristics, RSSI, and energy efficiency. Inputs to AI module 220 are further described in detail as follows.

Wi-Fi interference: The Wi-Fi interference can be measured by any metric including signal to noise ratio (SNR), number of nearby Wi-Fi access points, or channel utilization. Based on the interference, the link speed of the Wi-Fi connection reduces significantly. Once the link speed is below a threshold, the offload becomes undesirable.

Number of active users: The number of active users is an important parameter to offload. A Wi-Fi access point must address the request of connected client devices. Once the number of requests from users is too high, the data delivery rate becomes slow due to excessive number of users and collisions, and hence the QoS reduces.

Licensed spectrum status: Licensed spectrum is already purchased by the Wi-Fi access point owner/operator, and not utilizing the licensed spectrum might cause additional inefficiency. Once there is no significant demand in the licensed spectrum, the offloading becomes an issue since the interference probability in the licensed spectrum is relatively less. Thus, more data delivery might be possible.

Costs: The Wi-Fi access point operator must maintain the base stations. For the offloading, the Wi-Fi access point operator must install multiple Wi-Fi access points which require support constantly. The service from a Wi-Fi access point includes a cost likewise licensed spectrum data delivery.

Guest characteristics: Not all client devices provide significant benefit to Wi-Fi access point operator when their data is offloaded. The primary objective of the operator is to reduce the costs and increase the QoS of the customers. Using client device applications, the download patterns of client devices are tracked, and high downloading guest client devices are more likely to be offloaded to reduce the burden on the licensed spectrum. However, the selection of the guest client devices to offload is a function of other inputs as well.

RSSI: Low received signal strength of client devices leads to increased packet loss rate, which also leads to higher back off durations and hence inefficient channel utilization. This may cause client devices to transmit/receive fewer packets compared to the cellular networks.

Energy efficiency: Power consumed in each of the wireless states such as, but not limited to, transmit, receive, idle and doze, is an important indicator for the energy efficiency. Although Wi-Fi-based communication is mostly more energy efficient than those cellular-based communications for the unit-throughput ratio, excessive number of users, collisions and packet errors may cause Wi-Fi network 102 to consume more power than cellular network.

Consequently, in case a mobile operator decides to offload their cellular data to Wi-Fi network 102 making use of offload optimization module 218, the mobile operator can automatically let its users connect to Wi-Fi network 102 without any consent. In this way, the mobile operator always has an alternative option to transfer the data as the cheapest and most reliable way while using any Wi-Fi access point available.

In response to AI module 220 deciding that data offloading is desirable, a connection module 222 in Wi-Fi renting module 210 allows client device 108A to access/connect to selected Wi-Fi access point 106A. Connection module 222 is further described in detail in conjunction with FIG. 8 and FIG. 9.

Thereafter, client device 108A is enabled to transact with the owner of Wi-Fi access point 106A using cryptocurrencies in a blockchain-based network 224 using a cryptocurrency module 226 implemented in blockchain-based network 224. The cryptocurrencies are transferred from client device 108A to the owner of Wi-Fi access point 106A based on a required time of connection under predetermined constraints and conditions.

Blockchain-based network 224 is a distributed secure data management architecture, even if its application in mobile networks is limited due to the fact that blockchain clients require solving preset proof-of-work puzzles to add new data to the blockchain, which in fact consumes significant resources such as, but not limited, CPU and energy that is not applicable for resource-limited mobile devices. Thus, blockchain-related computing tasks are offloaded from plurality of client devices 108A-108N to the cloud server using cloud computing module 216 thus achieving trust among providers and data integrity throughout the entire communication from cloud platform 104 to plurality of client devices 108A-108N.

Cryptocurrency module 226 implemented in blockchain-based network 224 and other cryptocurrency methods are applicable to ensure validity of the transactions and delivery of the money faster. Cryptocurrency module 226 also does the mining and receives a fraction of the total transaction. All users can use the cryptocurrencies to rent Wi-Fi network 102 anywhere in the world.

Cloud platform 104 also provides a social platform 228 for Wi-Fi network 102 including plurality of client devices 108A-108N and plurality of Wi-Fi access points 106A-106N. Using social platform 228, the data from a client device 108A of plurality of client devices 108A-108N under the signal coverage of Wi-Fi access point 106A or a set of Wi-Fi access points of plurality of Wi-Fi access points 106A-106N are carried to other client devices of other locations when client device 108A encounters or receives a signal from a different Wi-Fi access point, by sharing the data with the other client devices.

Social platform 228 clusters/groups plurality of client devices 108A-108N of Wi-Fi network 102 under the criterion of receiving signal from a same Wi-Fi access point. Plurality of client devices 108A-108N of Wi-Fi network 102 might receive signal from different Wi-Fi access points and share the data to other client devices when they encounter a unique access point, which is a member of cloud platform 104. Also, plurality of client devices 108A-108N can track distribution of data and the number of users to which the data is delivered, through social platform 228.

The data delivered through social platform 228 from a particular client device 108A under the signal coverage of a particular Wi-Fi access point 106A or a set of Wi-Fi access points are carried to other locations, when client devices 108A-108N encounter or receive a signal from a different Wi-Fi access point by sharing the data to the new group. Therefore, the following terminologies are re-defined.

Follower: When a client device 108A posts a message, that message is seen by all client devices that hear the same Wi-Fi access points with client device 108A.

Followed: All client devices receive all the messages that are transmitted by a particular client device 108A that hear the same Wi-Fi access points.

The following table illustrates an interaction matrix between mobile devices M1-M8 and Wi-Fi access points AP1-#AP.

TABLE 1

| Mobile | AP1 | AP2 | AP3 | AP4 | #AP |
|---|---|---|---|---|---|
| M1 | 1 | | | | 1 |
| M2 | 1 | 1 | | | 2 |
| M3 | 1 | 1 | 1 | | 3 |
| M4 | 1 | 1 | 1 | | 3 |
| M5 | | | 1 | 1 | 2 |
| M6 | | | | 1 | 1 |
| M7 | | | | 1 | 1 |
| M8 | | | | 1 | 1 |

Data such as, but not limited to, video, picture, text or any kind of data from client device 108A is transferred to other locations which are under the coverage of a different Wi-Fi access point. Thus, the followers and the followed sources should change as client device 108A is exposed to the transmission from other Wi-Fi access points due to mobility. In turn, the data of client device 108A receives changes due to the mobility since it becomes a member of a different community. The data from a community can be carried to any other community if client devices want to distribute the data unless the content expires within a predefined time interval.

The interactions from client device 108A result in the distribution of the shared data to all client devices due to block diagonal type matrix of client device and Wi-Fi access point interactions as illustrated in in Table 1 through the followers. The list of followers for this particular case is shown in Table 2.

TABLE 2

| Mobile | AP1 | AP2 | AP3 | AP4 | Followers |
|---|---|---|---|---|---|
| M1 | M2, M3, M4 | | | | 3 |
| M2 | M1, M3, M4 | M3, M4 | | | 3 |
| M3 | M1, M2, M4 | M2, M4 | M4, M5 | | 4 |
| M4 | M1, M2, M3 | M1, M2 | M3, M5 | | 4 |
| M5 | | | M3, M4 | M6, M7, M8 | 5 |
| M6 | | | | M5, M7, M8 | 3 |
| M7 | | | | M5, M6, M8 | 3 |
| M8 | | | | M5, M6, M7 | 3 |

The users can track the propagation of their data through metrics such as, but not limited to, the number of reposts, the distance the data travels and the route the data follows. The privileged user must pay to broadcast particular data within a predefined frequency or range with additional options such as, but not limited to, different color or font.

For instance, iOS devices limit RF scan from externally installed applications, hindering the potential social media applications based on RF measurements, since it is difficult to determine the community without RF measurement. Once there is a nearby Android device available, it uploads the scan results to the cloud where it is smartly updated for the benefit of iOS devices even though Android devices are not necessarily connected to any particular Wi-Fi access point. Thus, Android devices provide data recursively to construct a map of Wi-Fi access points.

Figure 3:
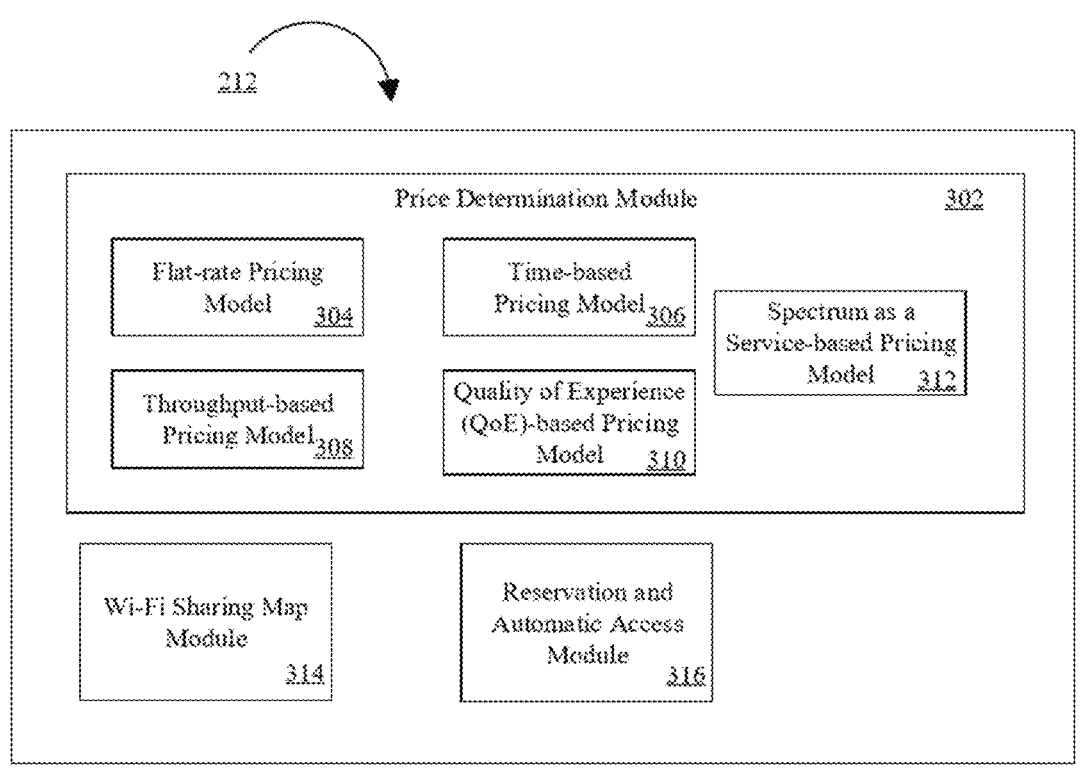
FIG. 3 illustrates various components of a selection module to enable a client device to select a Wi-Fi access point registered on the cloud platform in accordance with an embodiment of the invention.

FIG. 3 illustrates various components of selection module 212 to enable client device 108A to select Wi-Fi access point 106A registered on cloud platform 104 in accordance with an embodiment of the invention.

As illustrated in FIG. 3, selection module 212 includes a price determination module 302 for determining a usage fee for Wi-Fi access point access. The usage fee not only includes the duration of the connection but also the maximum download limit and maximum download rate. This provides fairness to all client devices and maintains the QoS of the Wi-Fi owner above a threshold. Nevertheless, the Wi-Fi access point owners may also be pursuing the highest profit.

Price determination module 302 includes one or more pricing models such as, but not limited to, a flat-rate pricing model 304, a time-based pricing model 306, a throughput-based pricing model 308, a quality of experience (QoE)-based pricing model 310, and a spectrum as a service-based pricing model 312.

QoE-based pricing model 310 offers pricing based on one or more QoS parameters offered to client device 108A and enables client device 108A to view QoE-related metrics which includes, but is not limited to, an expected re-buffering ratio, a bitrate quality, a bitrate switching frequency and throughput before connecting to a particular Wi-Fi access point 106A. The one or more QoS parameters include, but are not be limited to, latency, jitter, and packet loss rate.

Spectrum as a service-based pricing model 312 is used in case more than one client device is expected to utilize Wi-Fi network 102. The Wi-Fi spectrum is divided into sub-bands with different bandwidth such as, but not limited to, 20 MHz, 40 MHz, 80 MHz and the like, according to the price to be paid using techniques such as, but not limited to, spectrum brokerage, sub-channel sharing, and dynamic frequency selection. Therefore, plurality of client devices 108A-108N who are willing to connect to a particular Wi-Fi access point 106A can decide/chose for virtually reserving the total bandwidth.

Once the prices of Wi-Fi access point 106A usage are determined by Wi-Fi access point owners, client device 108A rents the connection for a certain amount of time by considering the cost, properties of the connection (802.11 protocol) and the signal quality.

A service for earning/spending virtual coins can also be added to the client device application (mobile application) such that Wi-Fi access point owners/client devices can earn or spend virtual coins produced by the application as they share or consume Wi-Fi network 102.

Further, selection module 212 includes a W-Fi sharing map module 314 which enables client device 108A to perform regional search for plurality of Wi-Fi access points 106A-106N at specific locations on a world map. Wi-Fi sharing map module 314 enables client device 108A to select Wi-Fi access point 106A at any address over Wi-Fi sharing map module 314 and automatically reserve Wi-Fi access point 106A for a specific day and time using a reservation and automatic access module 316. With reservation and automatic access module 316 it is also possible to select a Wi-Fi access point at any address using W-Fi sharing map module 314 and reserve it for a specific day and time. In this way, the Wi-Fi access point owner can keep his/her Wi-Fi access point open since he/she can be aware that the guest client device can be there at that time.

For instance, a person who wants to connect to the internet can also make a regional search on the world map within the application. In this way, locations with Wi-Fi access points can be seen in advance, and those locations can be reached on foot or by car while traveling. Thus, it will be easier for a user with an internet access at home to search and inquire whether he/she will have access to the internet at the location where he/she will travel.

As a result of the mutual early agreement, the password of Wi-Fi access point 106A is transmitted to the application of guest/client device 108A in an encrypted form. Once the guest/client device 108A arrives at that location, the application starts the channel scanning operations and automatically connects to Wi-Fi access point 106A.

Figure 4:
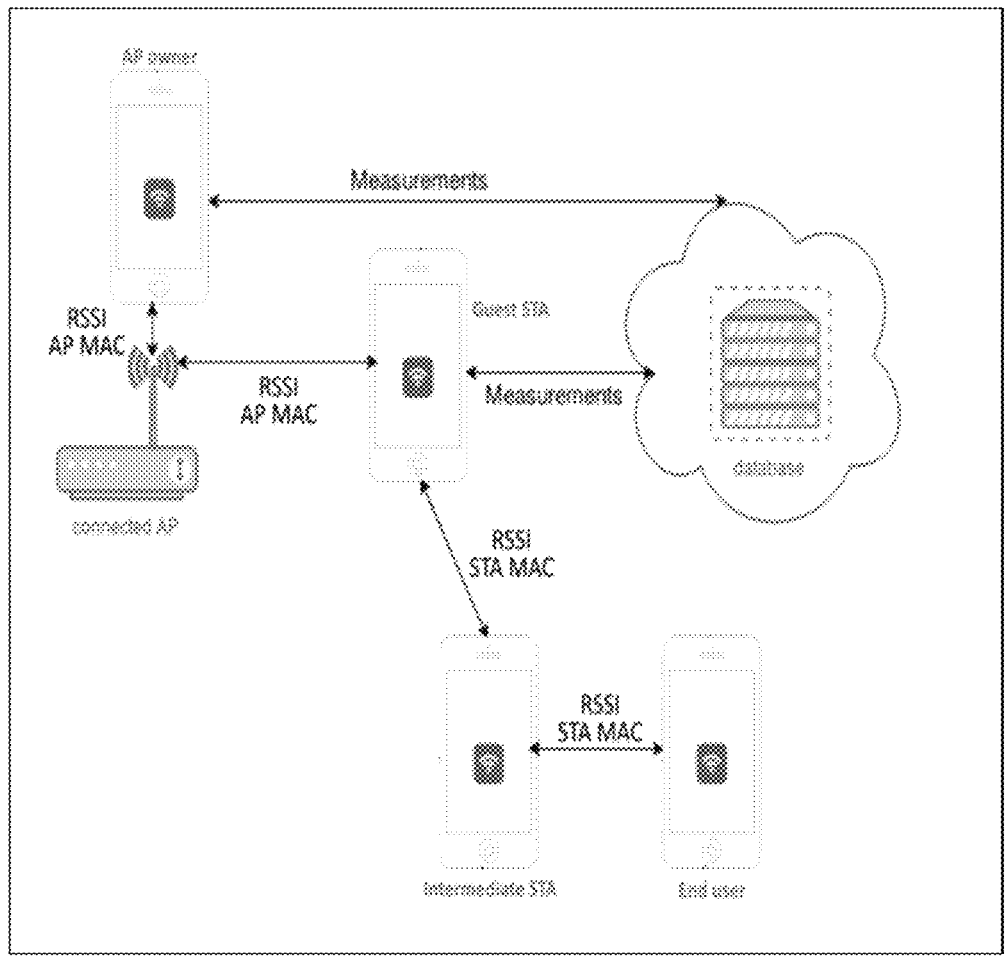
FIG. 4 illustrates an ad-hoc platform-based RF measurement module and measurements in the cloud in accordance with an embodiment of the invention.

FIG. 4 illustrates an ad-hoc platform-based RF measurement module 214 and measurements in the cloud in accordance with an embodiment of the invention.

As illustrated in FIG. 4, RF measurement module 214 delivers the nearby MAC addresses and RSSI values of available client devices and Wi-Fi access points in the vicinity at each scan. Once the measurements from one or several client devices are stored on the cloud, the measurements are evaluated and processed by a backend algorithm. This makes the centralized decision-making and clustering of Wi-Fi users feasible. The RF measurements stored on the cloud are updated once a new set of measurements is available from a particular client device 108A to reflect the last condition of the RF environment for real-time analysis.

The ad-hoc platform for RF measurement module 214 provides internet connection for client devices that are normally not able to connect to any Wi-Fi access point due to distance. This is further illustrated in FIG. 5.

Figure 5:
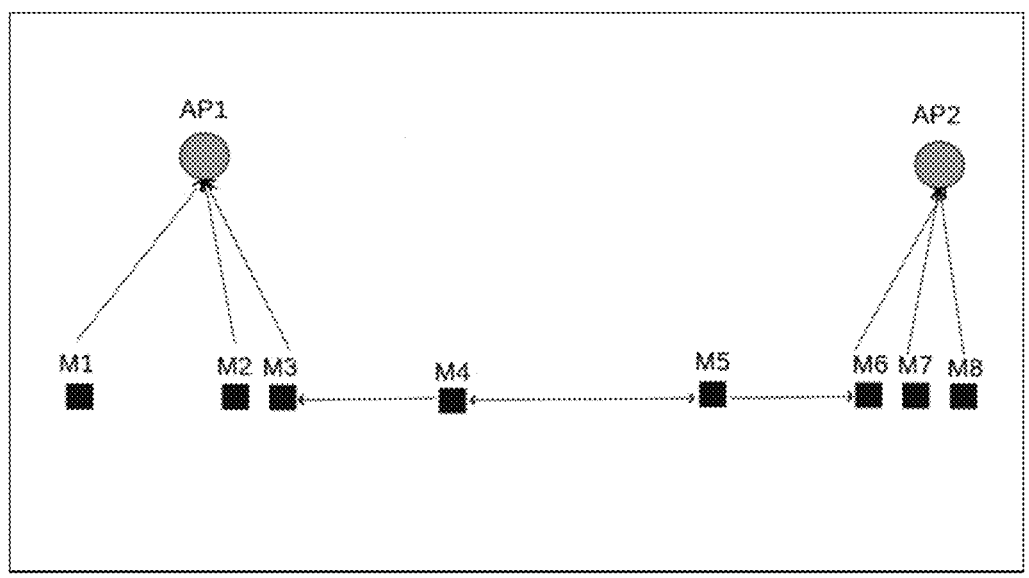
FIG. 5 illustrates a Wi-Fi network with client devices and Wi-Fi access points to describe the ad-hoc platform-based RF measurement module in accordance with an embodiment of the invention.

FIG. 5 illustrates a Wi-Fi network with client devices and Wi-Fi access points to describe ad-hoc platform-based RF measurement module 214 in accordance with an embodiment of the invention.

As illustrated in FIG. 5, a particular client device (for example, M4 or M5) under the signal coverage of another client device or a set of client devices are connected to each other via an ad-hoc platform to enable internet connection for that particular client device. Here, the following terminologies are also defined.

Follower: Any client device that can connect to one or more Wi-Fi access points through intermediate client devices are called followers. For example, M4 is the follower of M3 and M5, M5 is the follower of M4 and M6 as illustrated in FIG. 5.

Followed: Any Wi-Fi access point that can provide internet connection for client devices that are not able to associate with the Wi-Fi access point directly due to distance are called followed. For example, AP1 and AP2 are the followed APs both for M4 and M5 as illustrated in FIG. 5.

Further, through the ad-hoc platform, users can track the propagation of their data by the number of reposts, and the route the data follows. In order to connect to the internet, the followers have to pay a fee not only to the Wi-Fi access point owner, but also to client devices that contribute to the connection while connecting to the internet via the ad-hoc mesh network. For instance, AP1 owner and M3 are paid in case M4 is provided with internet through the AP1. Similarly, AP2 owner, M5 and M6 are paid in case M4 is provided with internet through AP2. In case there is more than one internet connection opportunity for a follower (for example, through AP1 or AP2), the connection path and the Wi-Fi access point to be connected is determined by the backend algorithm according to the RSSI and the number of reposts.

Figure 6:
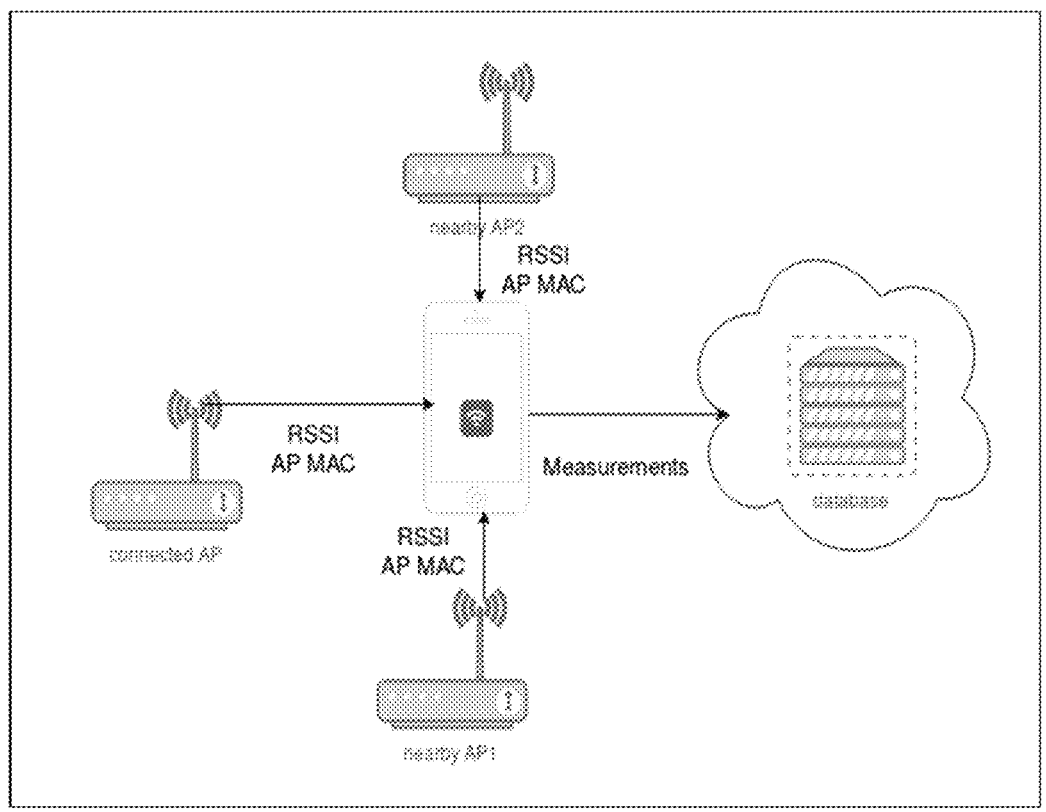
FIG. 6 illustrates a Wi-Fi access point-based RF measurement module and measurements in the cloud in accordance with an embodiment of the invention.

FIG. 6 illustrates Wi-Fi access point-based RF measurement module 214 and measurements in the cloud in accordance with an embodiment of the invention.

As illustrated in FIG. 6, the measurements in the cloud are updated once a new set of measurements is available from a particular client device in order to reflect the last condition of the RF environment for the real-time analysis. The RSSI matrix between client devices and Wi-Fi access points is not a full matrix since a particular client device receives signal from a subset of the Wi-Fi access points usually, depending on the locations of the Wi-Fi access points, client devices and the environmental conditions that cause signal propagation. This is further illustrated in FIG. 7.

Figure 7:
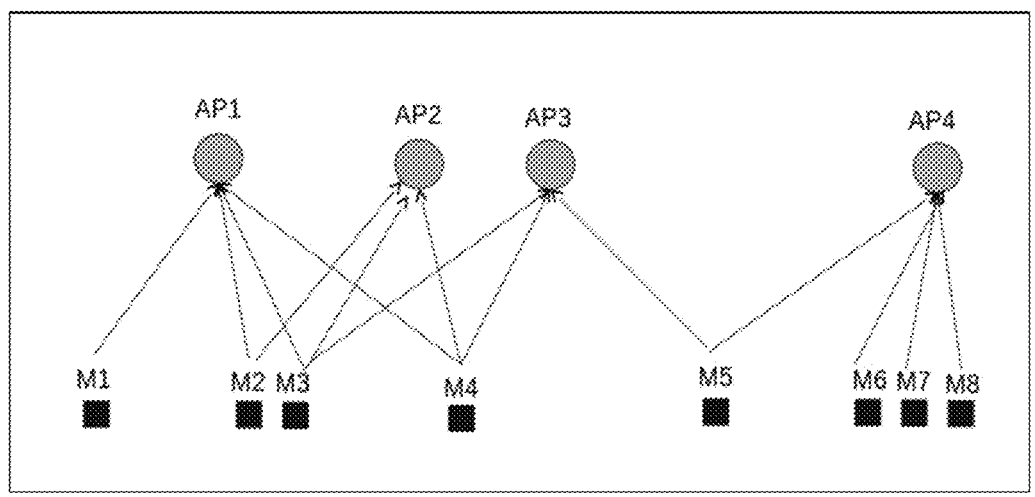
FIG. 7 illustrates a Wi-Fi network with client devices and Wi-Fi access points to describe the Wi-Fi access point-based RF measurement module in accordance with an embodiment of the invention.

FIG. 7 illustrates a Wi-Fi network with client devices and Wi-Fi access points to describe Wi-Fi access point-based RF measurement module 214 in accordance with an embodiment of the invention.

As illustrated in FIG. 7, the RSSI matrix between client devices and Wi-Fi access points is not a full matrix since a particular client device receives signal from a subset of the Wi-Fi access points usually, depending on the locations of the Wi-Fi access points, the client devices and the environmental conditions that cause signal propagation.

The Wi-Fi network lacks the RF measurements if the connected client devices have iOS only. To avoid the issue, an Android device which is a member of the architecture, uploads RF measurements when it meets a Wi-Fi access point with no recent measurements as if it is a part of the Wi-Fi network.

Figure 8:
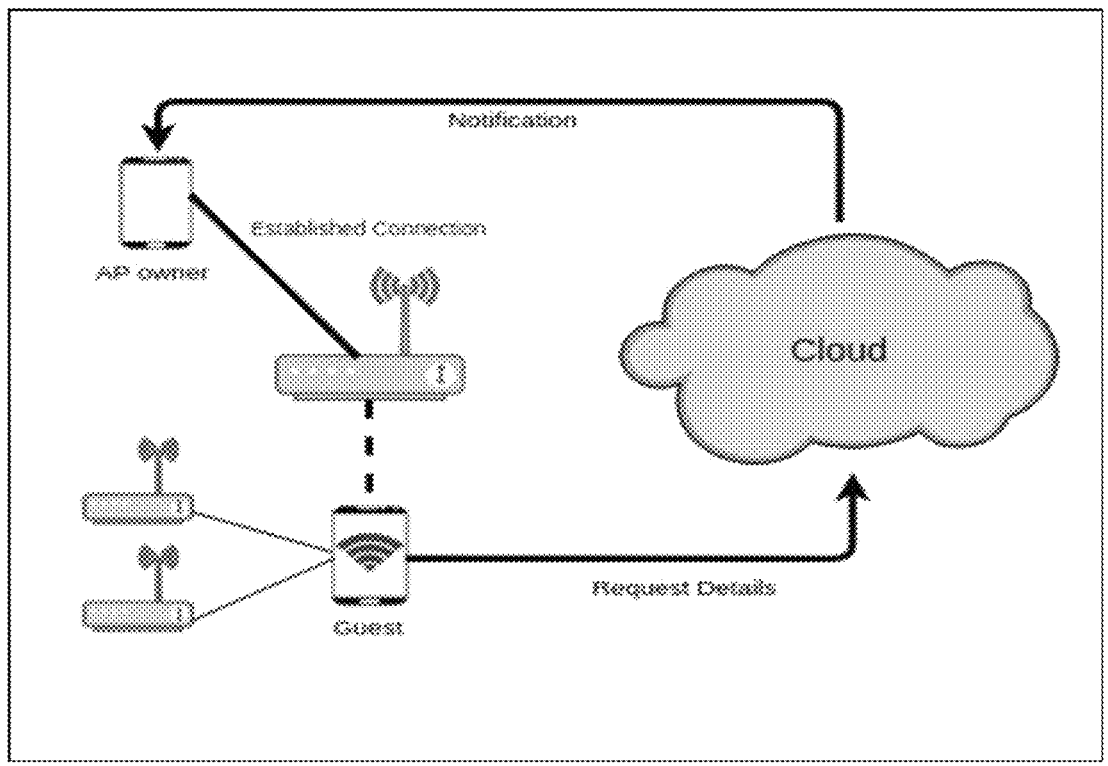
FIG. 8 illustrates a connection flow request to rent/share a Wi-Fi access point using a connection module in accordance with an embodiment.

FIG. 8 illustrates a connection flow request to rent/share a Wi-Fi access point using connection module 222 in accordance with an embodiment.

As illustrated in FIG. 8, connection module 222 serves the tracking of the connection status, connection requests, secure access, cryptocurrency transaction demands, location-based Wi-Fi access point searching and reservation.

A guest client device can send connection requests to any registered Wi-Fi access point. To send a connection request, the client device must obtain the beacon signal from the registered Wi-Fi access point. Thus, connection module 222 should have a Wi-Fi scan permission. The Wi-Fi access point owner can confirm (confirmation can be done instantly or at the time of reservation) the connection of the guest client device or reject the connection request. The procedure is applicable only if the Wi-Fi access point owner is also connected to the Wi-Fi access point for the security issues since not all routers are modifiable remotely from the cloud.

A Wi-Fi access point owner gets a notification after the connection or reservation request. If the Wi-Fi access point owner approves the connection/reservation, cryptocurrency module 226 is triggered to transfer money from the guest client device to the Wi-Fi access point owner based on the required time of connection under predetermined constraints and conditions.

Connection module 222 provides the connection by two methods. In the first method, the Wi-Fi password is shared with the user from the cloud and the connection is established by connection module 222 automatically. Sharing password can also be handled with encrypted message exchanges between the applications of the guest client device and the Wi-Fi access point owner, and after that the application lets the guest client device connect to the Wi-Fi access point with no explicit password sharing. Most Android versions limit the password sharing or viewing for such cases. However, its Wi-Fi access point owners risk sharing the password for the cases in which guest client devices share the password to someone else. Yet again, on the Wi-Fi access point side, the guest client device's MAC address can be added to the list of allowed MAC addresses. In this way, access to the Wi-Fi access point with another MAC address can be prevented.

In the second method, the Wi-Fi access point owner adds the guest client device to the white list of the Wi-Fi access point. Thus, guest client device on the white list can access the internet. On the other hand, MAC address of the guest client device is transferred to the blacklist after the connection time has exceeded or the accepted pricing model for the amount paid has ended.

Figure 9:
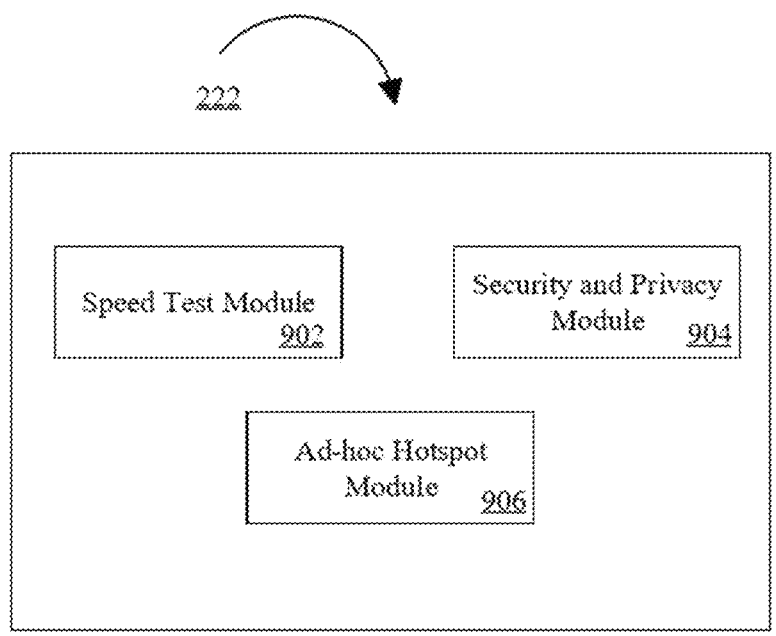
FIG. 9 illustrates various components of the connection module for allowing a client device to access/connect to a selected Wi-Fi access point registered on the cloud platform in accordance with an embodiment of the invention.

FIG. 9 illustrates various components of connection module 222 for allowing client device 108A to access/connect to selected Wi-Fi access point 106A registered on cloud platform 104 in accordance with an embodiment of the invention.

As illustrated in FIG. 9, connection module 222 includes a speed test module 902 to prepare a test connection for client device 108A who accepts the pricing conditions. In this context, a speed test can be performed by transmitting multiple pings to several pre-determined web pages such as, but not limited to, plurality of social networking sites, and the related information such as, but not limited to, delay, transmission rate, RSSI, and interference is shared with the user. Based on the information, the user of client device 108A decides whether to connect to Wi-Fi access point 106A.

Further, connection module 222 includes a security and privacy module 904 which allows client device 108A to access/connect to selected Wi-Fi access point 106A utilizing two different service set identifiers (SSIDs), to maintain security and privacy during network access.

Since there is an environment where both the service provider (Wi-Fi access point owner) and the service recipient (guest client device) are unreliable, two different SSIDs are used which includes a password protected private SSID for the Wi-Fi access point owner, and a public SSID without a password for guest client devices. Thus, the Wi-Fi access point is divided into two parts: the private and the public. This technique securely separates a private user from public users (and vice versa). The public part has its own Dynamic Host Configuration Protocol (DHCP) server with its own IP range. A second DHCP server is also used for the private SSID that is encrypted (for example, using Wi-Fi protected access (WPA)/wired equivalent privacy 2 (WPE2)). Thus, the Wi-Fi access point will have two virtual networks, utilizing only one wireless front-end and one wide area network (WAN) interface to the internet service provider (ISP).

To ensure secure connection, security and privacy module 904 tracks public users, for instance, to block a particular hotspot user or trace a law infringer. In this context, an open source captive portal that resides on a Wi-Fi access point can be implemented to authenticate public users. This way, public users are redirected to a captive portal, which has a link to a short registration and a login form, after they are connected to the hotspot. With the end of the registration process, users can connect to the internet without any limitations, as in a typical public hotspot.

To ensure security, in an embodiment, security and privacy module 904 uses a tunneling method instead of utilizing two different SSIDs. Here, the connection must pass through home network of a client device to ensure that the client device is reliable/secure. Therefore, in this scenario, the user of the client device at his/her home must use/have a broadband network.

To further increase the security, both the guest client device's and Wi-Fi access point owner's MAC and IP addresses, and other relevant information are stored in the cloud for a certain time using security and privacy module 904.

While these transactions are being carried out, information such as, but not limited to, who is sharing the internet with whom and where the exact locations of Wi-Fi access points are available, are maintained confidential. Also, the guest client device accessing the internet is informed that he/she is away from the Wi-Fi access point and the connection may break, considering privacy.

Connection module 222 also includes an ad-hoc hotspot module 906 which creates an ad-hoc based mesh hotspot consisting of other client devices of plurality of client devices 108A-108N which are hopped over to enable client device 108A to gain access to the internet.

For instance, a user, who is distant to Wi-Fi access point 106A that is intended to be associated with, but located near client device 108A is used either by the guest client device 108A or the Wi-Fi access point owner that is connected to the same Wi-Fi access point, will also be able to connect to the internet by making these clients devices an ad-hoc based mesh hotspot, and hopping over these nodes. The transactions in this scenario are processed so that the payment is made by the end user, not by the guest(s) hopped over.

A different pricing model, an ad-hoc based pricing model is realized in case internet access is carried out through ad-hoc hotspot module 906. In this scenario, the Wi-Fi access point owner receives his own profit through one of the previously mentioned pricing models such as, but not limited to, flat-rate pricing model 304, time-based pricing model 306, throughput-based pricing model 308, QoE-based pricing model 310 or spectrum as a service based pricing model 312. However, since internet access to the end user is provided by an intermediate device, in exchange for this service, a payment (or a reward) is also be made to the intermediate device, depending on the extent of the service. If internet access to the end user is provided by more than one mesh node, it is necessary to pay (reward) each node as much as the contribution they have made to this communication.

As a result, the end user will have to pay a fee not only to the Wi-Fi access point owner, but also to all nodes that contribute to this connection, while connecting to the internet via the ad-hoc mesh network. The contribution made by each node is calculated within ad-hoc hotspot module 906 using the ad-hoc based pricing model, taking into account the allocated processor capacity, the amount of energy consumed and the total time required for the operation.

Furthermore, users that are distant to the registered Wi-Fi access points are also able to scan ad-hoc cells in range using independent basic service set (IBSS) scanning by defining stanzas for each client device's wireless interface, setting the network SSID and the client device's operating mode to ad-hoc, to see if there are guests/intermediate client devices to be hopped over, through RF measurement module 214.

Figure 10:
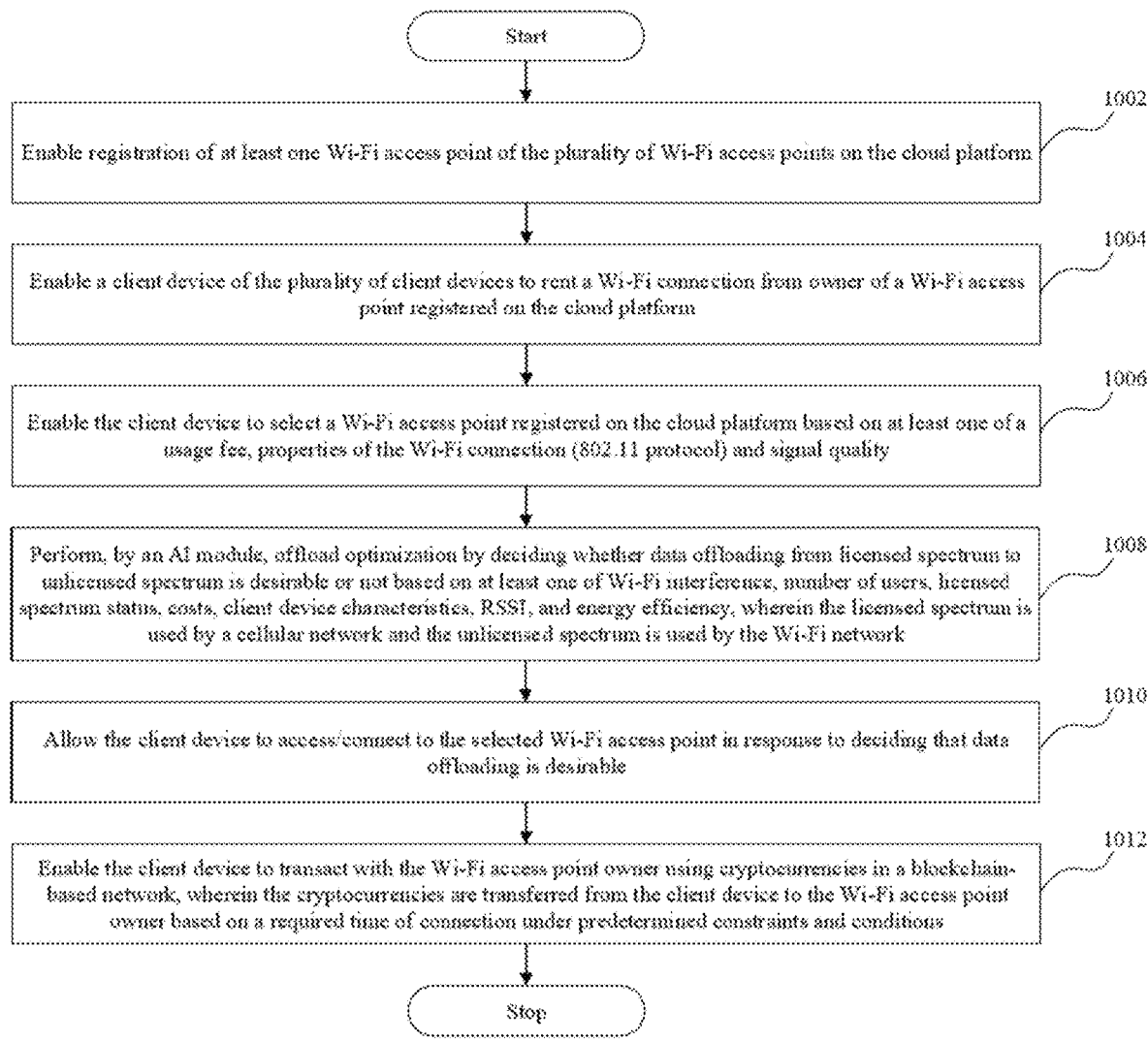
FIG. 10 illustrates a flow chart of a method for renting/sharing Wi-Fi in a Wi-Fi network using the cloud platform in accordance with an embodiment of the invention.

FIG. 10 illustrates a flow chart of a method for renting/sharing Wi-Fi in Wi-Fi network 102 using cloud platform 104 in accordance with an embodiment of the invention.

At step 1002, cloud platform 104 enables registration of one or more Wi-Fi access points of plurality of Wi-Fi access points 106A-106N.

In an ensuing step 1004, a client device of plurality of client devices 108A-108N is enabled to rent a Wi-Fi connection from owner of a Wi-Fi access point 106A of plurality of Wi-Fi access points 106A-106N registered on cloud platform 104.

For renting Wi-Fi access point 106A, at step 1006, client device 108A is enabled to select Wi-Fi access point 106A registered on cloud platform 104 based on criteria such as, but not limited to, usage fee, properties of the Wi-Fi connection (802.11 protocol) and signal quality.

Once Wi-Fi access point 106A is selected for renting, at step 1008, Wi-Fi renting module 210 utilizes offload optimization module 218 for performing offload optimization using AI module 220 by deciding whether data offloading from licensed spectrum to unlicensed spectrum is desirable or not based on parameters such as, but not limited to, Wi-Fi interference, number of users, licensed spectrum status, costs, client device characteristics, RSSI, and energy efficiency. The licensed spectrum is used by a cellular network and the unlicensed spectrum is used by the Wi-Fi network.

In response to AI module 220 deciding that data offloading is desirable, at step 1010, connection module 222 in Wi-Fi renting module 210 allows client device 108A to access/connect to selected Wi-Fi access point 106A.

Thereafter, at step 1012, client device 108A is enabled to transact with the owner of Wi-Fi access point 106A using cryptocurrencies in blockchain-based network 224 using cryptocurrency module 226. The cryptocurrencies are transferred from client device 108A to the owner of Wi-Fi access point 106A based on a required time of connection under predetermined constraints and conditions.

The present invention is advantageous in that it provides a cloud platform for sharing Wi-Fi in a Wi-Fi network including a plurality of Wi-Fi access points and a plurality of client devices and enabling data offload optimization decisions both for the operator and customer directly.

Further, the invention provides for secure and efficient money transactions between the client devices and Wi-Fi access point owners through cryptocurrency payments without needing a trusted authority such as a, but not limited to, bank. The invention implemented in client devices via a mobile application protects the devices from all malicious attacks and entities.

Mobile operators also use the fair payment protocol through the cryptocurrency method. In this way, mobile operators can outsource any available resources, infrastructures available, to maximize the way to transfer their data without a hassle of current payment protocols.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for sharing Wi-Fi in a Wi-Fi network using a cloud platform, wherein the Wi-Fi network includes a plurality of Wi-Fi access points and a plurality of client devices, the method comprising:
enabling registration of at least one Wi-Fi access point of the plurality of Wi-Fi access points on the cloud platform;
enabling a client device of the plurality of client devices to rent a Wi-Fi connection from an owner of the at least one Wi-Fi access point registered on the cloud platform, wherein the renting comprises:
enabling the client device to select the at least one Wi-Fi access point registered on the cloud platform based on at least one of a usage fee, properties of the Wi-Fi connection (802.11 protocol) and signal quality;
performing, by an AI module, offload optimization based on a decision whether data offloading from licensed spectrum to unlicensed spectrum is desirable based on at least one of Wi-Fi interference, number of users, licensed spectrum status, costs, client device characteristics, RSSI, and energy efficiency, wherein the licensed spectrum is used by a cellular network and the unlicensed spectrum is used by the Wi-Fi network; and
in response to deciding that data offloading is desirable, allowing the client device to access/connect to the selected at least one Wi-Fi access point; and
enabling the client device to transact with the owner of the at least one Wi-Fi access point using cryptocurrencies in a blockchain-based network, wherein the cryptocurrencies are transferred from the client device to the owner of the at least one Wi-Fi access point based on a required time of connection and at least one of a predetermined constraint and a predetermined condition.

2. The method of claim 1, wherein registration of the at least one Wi-Fi access point is made through a device application or website via submission of at least one of a Wi-Fi password, gateway user name, gateway password, Wi-Fi access point MAC address, Wi-Fi properties and usage fee.

3. The method of claim 1, wherein the usage fee for accessing a Wi-Fi access point is determined and set by the owner of the at least one Wi-Fi access point using at least one pricing model, wherein a pricing model is at least one of a flat-rate pricing model, a time-based pricing model, a throughput-based pricing model, a quality of experience (QoE)-based pricing model, and a spectrum as a service-based pricing model.

4. The method of claim 3, wherein the QoE-based pricing model offers pricing based on at least one QoS parameter offered to the client device and enables the client device to view QoE-related metrics comprising at least one of an expected re-buffering ratio, a bitrate quality, a bitrate switching frequency and throughput before connecting to a particular Wi-Fi access point, wherein the at least one QoS parameter comprises at least one of latency, jitter, and packet loss rate.

5. The method of claim 3, wherein the spectrum as a service based pricing model is used in case more than one client device is expected to utilize the Wi-Fi network, wherein the Wi-Fi spectrum is divided into sub-bands with different bandwidth, according to the price to be paid using techniques comprising at least one of spectrum brokerage, sub-channel sharing, and dynamic frequency selection.

6. The method of claim 1, wherein the selecting further comprises enabling the client device to perform regional search for Wi-Fi access points at specific locations on a world map using an internet sharing map module, and enabling the client device to select a Wi-Fi access point at an address over the internet sharing map module and automatically reserving the Wi-Fi access point at the address for a specific day and a specific time.

7. The method of claim 6 further comprises tracking at least one of Wi-Fi connection status, connection requests, secure access, cryptocurrency transaction demands, location-based Wi-Fi access point searching and reservation and enabling a client device to send a connection request to a Wi-Fi access point registered on the cloud platform.

8. The method of claim 1, wherein performing offload optimization further comprises enabling mobile operators to reduce costs and increase Quality of Service (QoS) for a user of a client device by tracking download patterns of the plurality of client devices and enabling a high downloading client device of the plurality of client devices to offload data to reduce the burden on the licensed spectrum, wherein the AI module decides that data offloading is desirable when there is enough demand in the licensed spectrum or if the unlicensed spectrum is significantly idle.

9. The method of claim 1, wherein the renting comprises collecting RF measurements to report probable Wi-Fi access points for connection or offloading cellular data to the Wi-Fi network and storing the RF measurements on the cloud platform, wherein the RF measurements comprise information such as nearby MAC addresses and RSSI values of available client devices and Wi-Fi access points in the vicinity at each scan.

10. The method of claim 9, wherein the RF measurements stored on the cloud platform are evaluated and processed by a backend algorithm for centralized decision-making and clustering of Wi-Fi access points, wherein the RF measurements stored on the cloud platform are updated based on a new set of measurements which is available from a particular client device in order to reflect the last condition of the RF environment for real time analysis.

11. The method of claim 1, wherein allowing the client device to access/connect to the selected Wi-Fi access point comprises performing a speed test for the at least one Wi-Fi access point connection based on a transmission of multiple pings to a plurality of pre-determined web pages, and sharing related information with a user of the client device, wherein the related information comprises at least one of delay, transmission rate, RSSI, and interference.

12. The method of claim 1, wherein the client device is allowed to access/connect to the selected Wi-Fi access point based on a utilization of two different SSIDs namely a password protected private SSID for the owner of the at least one Wi-Fi access point, and a public SSID without a password for the client device, to maintain security and privacy during network access.

13. The method of claim 1, wherein the client device is allowed to access/connect to the selected Wi-Fi access point and create an ad-hoc based mesh hotspot that consists of other client devices which are hopped over to enable the client device gain access to the internet.

14. The method of claim 1 further comprises providing a social platform for the Wi-Fi network comprising the plurality of client devices and the plurality of Wi-Fi access points, wherein data from a client device of the plurality of client devices under the signal coverage of a Wi-Fi access point or a set of Wi-Fi access points of the plurality of Wi-Fi access points are carried to other client devices of other locations when the client device encounters or receives a signal from a different Wi-Fi access point, by sharing the data with the other client devices.

15. A system for sharing Wi-Fi in a Wi-Fi network using a cloud platform, wherein the Wi-Fi network includes a plurality of Wi-Fi access points and a plurality of client devices, the system comprising:
a memory;
a processor communicatively coupled to the memory, wherein the processor is configured to:
enable registration of at least one Wi-Fi access point of the plurality of Wi-Fi access points on the cloud platform;
enable a client device of the plurality of client devices to rent a Wi-Fi connection from an owner of the at least one Wi-Fi access point registered on the cloud platform, wherein the processor is further configured to:
enable the client device to select the at least one Wi-Fi access point registered on the cloud platform based on at least one of a usage fee, properties of the Wi-Fi connection (802.11 protocol) and signal quality;
perform, by an AI module, offload optimization based on a decision whether data offloading from licensed spectrum to unlicensed spectrum is desirable based on at least one of Wi-Fi interference, number of users, licensed spectrum status, costs, client device characteristics, RSSI, and energy efficiency, wherein the licensed spectrum is used by a cellular network and the unlicensed spectrum is used by the Wi-Fi network; and
in response to deciding that data offloading is desirable, allow the client device to access/connect to the selected at least one Wi-Fi access point; and
enable the client device to transact with the owner of the at least one Wi-Fi access point using cryptocurrencies in a blockchain-based network, wherein the cryptocurrencies are transferred from the client device to the owner of the at least one Wi-Fi access point based on a required time of connection at least one of a predetermined constraint and a predetermined condition.

16. The system of claim 15, wherein registration of the at least one Wi-Fi access point is made through a device application or website via submission of at least one of a Wi-Fi password, gateway user name, gateway password, Wi-Fi access point MAC address, Wi-Fi properties and usage fee.

17. The system of claim 15, wherein the usage fee for accessing a Wi-Fi access point is determined and set by the owner of the at least one Wi-Fi access point using at least one pricing model, wherein a pricing model is at least one of a flat-rate pricing model, a time-based pricing model, a throughput-based pricing model, a quality of experience (QoE)-based pricing model, and a spectrum as a service-based pricing model.

18. The system of claim 17, wherein the QoE-based pricing model offers pricing based on at least one QoS parameter offered to the client device and enables the client device to view QoE-related metrics comprising at least one of an expected re-buffering ratio, a bitrate quality, a bitrate switching frequency and throughput before connecting to a particular Wi-Fi access point, wherein the at least one QoS parameter comprises at least one of latency, jitter, and packet loss rate.

19. The system of claim 17, wherein the spectrum as a service based pricing model is used in case more than one client device is expected to utilize the Wi-Fi network, wherein the Wi-Fi spectrum is divided into sub-bands with different bandwidth according to the price to be paid using techniques comprising at least one of spectrum brokerage, sub-channel sharing, and dynamic frequency selection.

20. The system of claim 15, wherein the processor is configured to enable the client device to perform regional search for Wi-Fi access points at specific locations on a world map using an internet sharing map module, and enable the client device to select a Wi-Fi access point at an address over the internet sharing map module and automatically reserve the Wi-Fi access point at the address for a specific day and a specific time.

21. The system of claim 20, wherein the processor is further configured to track at least one of Wi-Fi connection status, connection requests, secure access, cryptocurrency transaction demands, location-based Wi-Fi access point searching and reservation and enable a client device to send a connection request to a Wi-Fi access point registered on the cloud platform.

22. The system of claim 15, wherein the processor is further configured to enable mobile operators to reduce costs and increase Quality of Service (QoS) for a user of a client device by tracking download patterns of the plurality of client devices and enabling a high downloading client device of the plurality of client devices to offload data to reduce the burden on the licensed spectrum, wherein the AI module decides that data offloading is desirable when there is enough demand in the licensed spectrum or if the unlicensed spectrum is significantly idle.

23. The system of claim 15, wherein the processor is configured to collect RF measurements to report probable Wi-Fi access points for connection or offloading cellular data to the Wi-Fi network and store the RF measurements on the cloud platform, wherein the RF measurements comprise information such as nearby MAC addresses and RSSI values of available client devices and Wi-Fi access points in the vicinity at each scan.

24. The system of claim 23, wherein the RF measurements stored on the cloud platform are evaluated and processed by a backend algorithm for centralized decision-making and clustering of Wi-Fi access points, wherein the RF measurements stored on the cloud platform are updated based on a new set of measurements which is available from a particular client device in order to reflect the last condition of the RF environment for real time analysis.

25. The system of claim 15, wherein the processor is further configured to perform a speed test for the at least one Wi-Fi access point connection based on a transmission of multiple pings to a plurality of pre-determined web pages, and share related information with a user of the client device, wherein the related information comprises at least one of delay, transmission rate, RSSI, and interference.

26. The system of claim 15, wherein the processor is further configured to utilize two different SSIDs namely a password protected private SSID for the owner of the at least one Wi-Fi access point, and a public SSID without a password for the client device, to maintain security and privacy during network access.

27. The system of claim 15, wherein the processor is further configured to create an ad-hoc based mesh hotspot that consists of other client devices which are hopped over to enable the client device gain access to the internet.

28. The system of claim 15, wherein the processor is further configured to provide a social platform for the Wi-Fi network comprising the plurality of client devices and the plurality of Wi-Fi access points, wherein data from a client device of the plurality of client devices under the signal coverage of a Wi-Fi access point or a set of Wi-Fi access points of the plurality of Wi-Fi access points are carried to other client devices of other locations when the client device encounters or receives a signal from a different Wi-Fi access point, by sharing the data with the other client devices.

* * * * *